No. 793,859. PATENTED JULY 4, 1905.
C. K. TODD.
POULTRY WATERER.
APPLICATION FILED MAY 6, 1905.
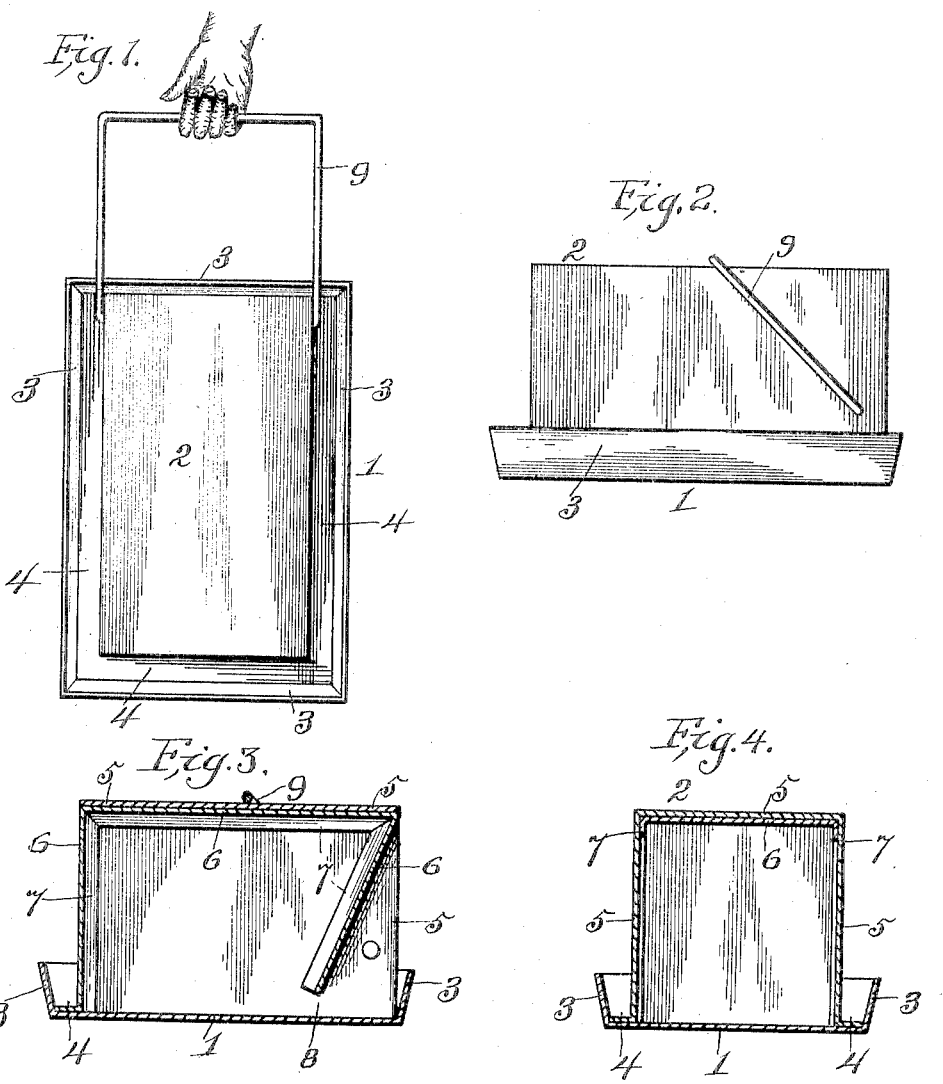
WITNESSES:
INVENTOR
Charles K. Todd
BY
Taber & Whitman Co
Attorneys No. 793,859. Patented July 4, 1905.

UNITED STATES PATENT OFFICE.

CHARLES K. TODD, OF LAHARPE, ILLINOIS.

POULTRY-WATERER.

SPECIFICATION forming part of Letters Patent No. 793,859, dated July 4, 1905.

Application filed May 6, 1905. Serial No. 259,199.

*To all whom it may concern:*

Be it known that I, CHARLES K. TODD, a citizen of the United States, residing at Laharpe, in the county of Hancock and State of Illinois, have invented certain new and useful Improvements in Poultry-Waterers, of which the following is a specification.

This invention relates to watering devices for poultry, and pertains especially to a combination water-bucket and drinking-pan.

The object of the invention is to provide a bucket-like device having a pan provided with an upturned flange surrounding the pan for watering poultry. Similar devices have heretofore been employed for watering poultry; but their construction and arrangement are such as to unfit them for successful practical use for carrying water. It is therefore the purpose of this invention to overcome the objections and disadvantages found in such devices and to furnish a device adapted to carry water without spilling and supply the pan with water for poultry-drinking.

In the accompanying drawings, forming part of this application, Figure 1 represents the device as used for carrying water. Fig. 2 shows the device in position to water poultry. Fig. 3 is a longitudinal section. Fig. 4 is a cross-section.

The same numeral references denote the same parts throughout the several views of the drawings.

The device is made of any suitable thin sheet metal, preferably rectangular and in three parts, two of which constitute the body or bucket and the other the pan. The pan 1 forms one side of the rectangular-shaped bucket 2, and a flaring flange 3, projecting from the pan, surrounds this bucket side to form a trough 4 entirely around the device, so that drinking from the trough is not confined to one end or side of the device. The outer sheet of metal 5 of the bucket has proper connection with the pan, preferably by soldering, and the inner sheet 6 has inturned flanges 7, by which this sheet is secured to the outer sheet. One end of the sheet 6 is inclined and terminates short of the pan to form a water-passage 8, and the other end forms the bottom of the device when used as a bucket and the end of the device when used as a waterer. A bail 9 is pivoted to the sides of the outer sheet, so as to stand vertically from the end of the device in carrying it and to be swung over said end onto the top of the device when the latter is used for watering.

It will be seen that in carrying water the device is equal to or better than an ordinary bucket, owing to its shape and position of the bail, so that it may be tilted or swung without wasting or spilling the water.

It is obvious that the surrounding trough affords means for watering great numbers of fowls at the same time, and that the peculiar arrangement and combination of parts produces a simple, durable, and inexpensive poultry-waterer.

Having thus described my invention, what I claim as new, and desire to secure by Letters Patent, is—

1. A poultry-waterer comprising a pan having a surrounding flaring flange, a water-carrier secured to the pan so as to form a surrounding trough, one side of the carrier being formed by the pan with a water-passage between the pan and one end of the carrier, and a bail pivoted in this end of the carrier.

2. A poultry-waterer comprising a pan having a surrounding flange, a rectangular water-carrier having one side closed by the pan and composed of two parts one of said parts forming the carrier ends with a water-passage between one of said ends and the pan, and the other of said parts constituting three sides of the carrier, and a bail pivoted to swing over one of said ends.

3. In a poultry-waterer, the combination with a pan, of an outer metal sheet having its side edges secured to the pan to form side troughs, an inner metal sheet having flanges secured to the said sides, one end of the inner sheet being inclined and terminating short of the pan to form a water-passage, and the other end being secured to the pan, and a suitable bail pivoted to the sides of the outer sheet.

In testimony whereof I affix my signature in presence of two witnesses.

CHARLES K. TODD.

Witnesses:
Q. W. HUNGATE,
R. B. WILLIAMS.